US006040063A

United States Patent [19]
Doane et al.

[11] Patent Number: 6,040,063
[45] Date of Patent: Mar. 21, 2000

[54] BIODEGRADABLE POLYESTER AND NATURAL POLYMER LAMINATES

[75] Inventors: William M. Doane, Morton; John W. Lawton, Jr., Chillicothe; Randal Shogren, Peoria, all of Ill.

[73] Assignees: The United States of America as represented by the Secretary of Agriculture, Washington, D.C.; Biotechnology Research & Development Corp., Peoria, Ill.

[21] Appl. No.: 09/231,729

[22] Filed: Jan. 15, 1999

Related U.S. Application Data

[62] Division of application No. 08/673,273, Jun. 28, 1996, Pat. No. 5,861,216.

[51] Int. Cl.[7] .................................................. B32B 23/04
[52] U.S. Cl. ..................... 428/532; 428/36.5; 428/36.91; 428/318.4; 428/480
[58] Field of Search ................................ 428/36.5, 36.91, 428/318.4, 480, 532

[56] References Cited

U.S. PATENT DOCUMENTS

| | | |
|---|---|---|
| 3,149,085 | 9/1964 | Ball et al. . |
| 3,850,862 | 11/1974 | Clendinning et al. . |
| 3,901,838 | 8/1975 | Clendinning et al. . |
| 3,921,333 | 11/1975 | Clendinning et al. . |
| 3,923,729 | 12/1975 | Clendinning et al. . |
| 3,931,068 | 1/1976 | Clendinning et al. . |
| 3,932,319 | 1/1976 | Clendinning et al. . |
| 3,949,145 | 4/1976 | Otey et al. . |
| 4,016,117 | 4/1977 | Griffin . |
| 4,344,857 | 8/1982 | Shasha et al. . |
| 4,483,950 | 11/1984 | Fanta et al. . |
| 4,863,655 | 9/1989 | Lacourse et al. . |
| 4,873,270 | 10/1989 | Aime et al. . |
| 4,911,952 | 3/1990 | Doane et al. . |
| 4,983,651 | 1/1991 | Griffin . |
| 5,095,054 | 3/1992 | Lay et al. . |
| 5,171,820 | 12/1992 | Mang et al. . |
| 5,183,690 | 2/1993 | Carr et al. . |
| 5,185,382 | 2/1993 | Neumann et al. . |
| 5,186,990 | 2/1993 | Starcevich . |
| 5,219,646 | 6/1993 | Gallagher et al. . |
| 5,234,977 | 8/1993 | Bastioli et al. . |
| 5,252,271 | 10/1993 | Jeffs . |
| 5,256,711 | 10/1993 | Tokiwa et al. . |
| 5,272,181 | 12/1993 | Boehmer et al. . |
| 5,292,782 | 3/1994 | Bastioli et al. . |
| 5,321,064 | 6/1994 | Vaidya et al. . |
| 5,346,936 | 9/1994 | Buehler et al. . |
| 5,360,830 | 11/1994 | Bastioli et al. . |
| 5,384,187 | 1/1995 | Uemura et al. . |
| 5,391,423 | 2/1995 | Wnuk et al. . |
| 5,412,005 | 5/1995 | Bastioli et al. . |
| 5,422,387 | 6/1995 | Toms et al. . |
| 5,439,953 | 8/1995 | Ritter et al. . |
| 5,446,078 | 8/1995 | Vaidya et al. . |
| 5,459,258 | 10/1995 | Merrill et al. . |
| 5,462,983 | 10/1995 | Bloembergen et al. . |
| 5,496,910 | 3/1996 | Mang et al. . |
| 5,510,401 | 4/1996 | Dehennau et al. . |
| 5,574,076 | 11/1996 | Sharak et al . |
| 5,583,187 | 12/1996 | Sharak et al. . |

FOREIGN PATENT DOCUMENTS

| | | |
|---|---|---|
| 0513679 | 5/1992 | European Pat. Off. . |
| 0535994 | 4/1993 | European Pat. Off. . |
| 0667369 | 8/1995 | European Pat. Off. . |
| 2735483 | 6/1995 | France . |
| 4411051 | 3/1994 | Germany . |
| 5-320326 | 12/1993 | Japan . |
| 90/01043 | 2/1990 | WIPO . |
| 92/02363 | 2/1992 | WIPO . |
| 93/00399 | 1/1993 | WIPO . |
| 93/11937 | 6/1993 | WIPO . |
| 93/14911 | 6/1993 | WIPO . |
| 96/03454 | 7/1995 | WIPO . |
| 97/23564 | 7/1997 | WIPO . |

OTHER PUBLICATIONS

Koenig et al., "Biodegradable Polymer/Starch Blends, Composites, and Coatings," *PMSE*, 37, pp. 290–291 (1992).

Kotnis et al., "Processing and Mechanical Properties of Biodegradable Poly(hydroxybutyrate–co–valerate)–Starch Compositions," *J. Environ. Polymer Degradation*, 3:2, pp. 97–105 (1995).

Lim et al., "Effect of Starch Granule Size on Physical Properties of Starch–Filled Polyethylene Film," *Biotechnol. Prog.*, 8, pp. 51–57 (1992).

Mang et al., "Synthesis and Properties of Thermoplastic Hydroxy–Functional Polyesters Derived from Diacids and Diglycidyl Ethers," *Polymer Preprints*, 36:2, pp. 180–181 (1995).

Ramsay et al., "Biodegradability and Mechanical Properties of Poly–(β–Hydroxybutyrate–Co–β–Hydroxyvalerate)–Starch Blends," *Applied and Environmental Microbiology*, 59:4, pp. 1242–1246 (Apr. 1993).

Shogren et al., "Development of Starch Based Plastics—A Reexamination of Selected Polymer Systems in Historical Perspective," *Starch/Stärke*, 45:8, pp. 276–280 (1993).

Tatarka, Paul D., "Can Agricultural Materials Compete with Expanded Polystyrene in the Loose–Fill Market?", *The Plastics Challenge –A Revolution in Education*, Proceedings of the SPE 53rd Annual Technical Conference & Exhibits, pp. 2225–2231 (1995).

Union Carbide's "Material Safety Data Sheet" containing information on Additives, e.g. nomeclature and structure (Oct. 31, 1994).

(List continued on next page.)

*Primary Examiner*—Helen L. Pezzuto
*Attorney, Agent, or Firm*—Majestic, Parsons, Siebert & Hsue

[57] ABSTRACT

Articles are provided in which a self-supporting structure formed of natural polymer has a self-adherent, moisture resistant hydroxy-functional polyester on the structure surface. The self-supporting structure preferably is a starch and polyvinyl alcohol blend in an expanded form. The articles typically do not delaminate even when soaked in water, and are biodegradable.

11 Claims, 2 Drawing Sheets

OTHER PUBLICATIONS

Shogren, R.L., "Poly(ethylene oxide) –Coated Granular Starch–Poly(hydroxybutyrate–co–hydroxyvalerate) Composite Materials," *J. Environ. Polymer Degradation*, 3:2, pp. 75–80 (1995).

Tiefenbacher, Karl F., "Starch–Based Foamed Materials —Use and Degradation Properties," *J.M.S.–Pure Appl. Chem.*, A30 (9–10), pp. 727–731 (1993).

Westhoff et al., "Starch–Polyvinyl Alcohol Films—Effect of Various Plasticizers," *Starch–Stärke*, 31, pp. 163–165 (1979).

Lawton & Fanta, "Glycerol–Plasticized Films Prepared from Starch –Poly(vinyl alcohol) Mixtures: Effect of Poly-(ethylene–co–acrylic Acid)," *Carbohydrate Polymers*, 23, pp. 275–280 (1994).

McCarthy et al., "Recent Advances in Biodegradable Polymers and Blends," Corn Utilization Conference VI, St. Louis, Missouri, Jun. 4–6, 1996.

Shogren et al., "Biodegradable Starch–Polyester Composites," Corn Utilization Conference VI, St. Louis, Missouri, Jun. 4–6, 1996.

Abstract of JP 05320326–A, Dec. 3, 1993, as found in Database WPI, Week 9402, Mar. 16, 1994, AN 94–012391/02.

Fritz et al., "Der Einsatz von Stärke bei der Modifizierung synthetischer Kunststoffe," *Starch/Stärke*, 45, No. 9, (1993) pp. 314–322.

Swanson et al., "Skin and Layer Formation in Films Prepared from Carboydrates, Poly(ethylene–co–acrylic acid), and Polyethylene," *J. of Applied Polymer Science*, 49, No. 10 (Sep. 10, 1993), pp. 1683–1693.

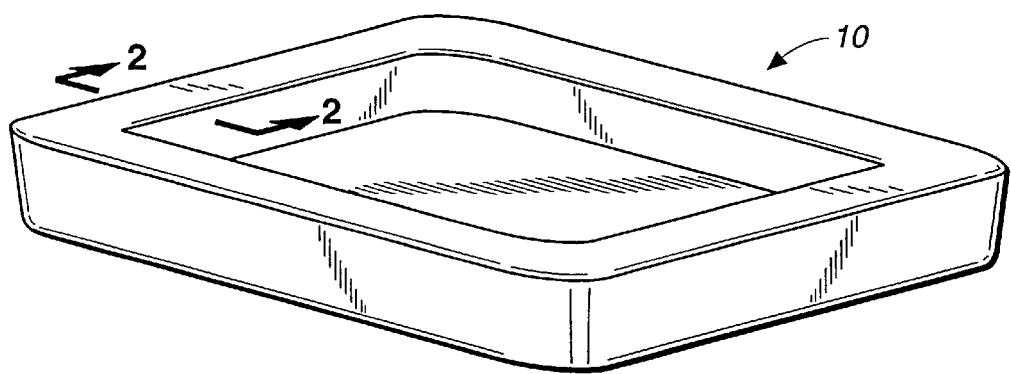
FIG._1
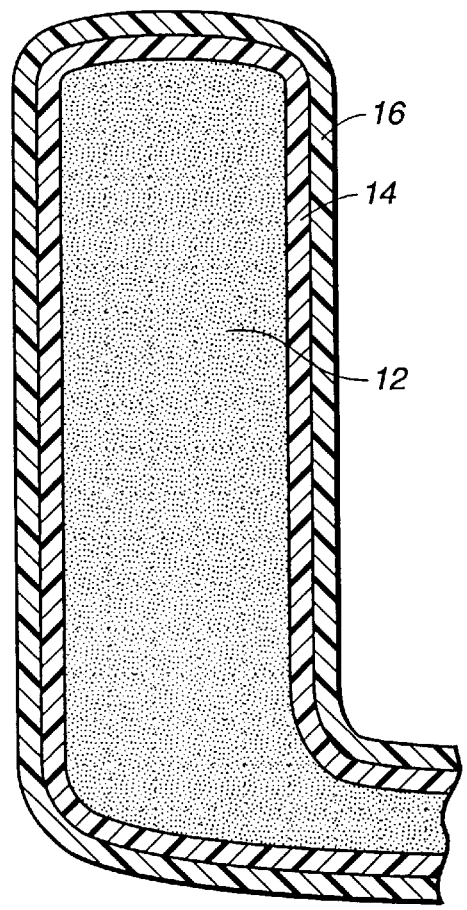
FIG._2

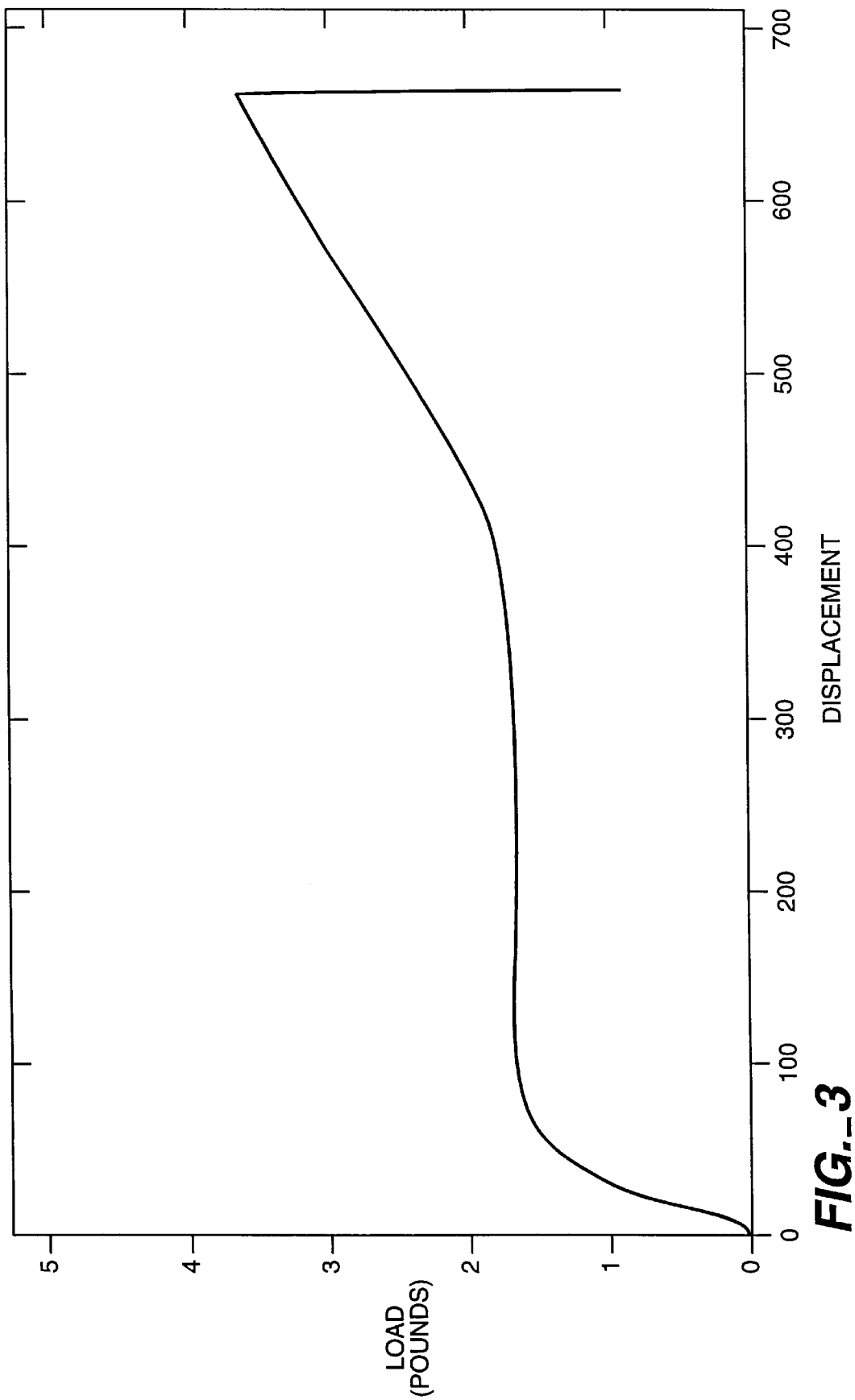
FIG._3

BIODEGRADABLE POLYESTER AND NATURAL POLYMER LAMINATES

This is a division of application Ser. No. 08/673,273, filed Jun. 28, 1996 U.S. Pat. No. 5,861,216.

FIELD OF THE INVENTION

The present invention generally relates to disposable articles, and more particularly relates to biodegradable articles having self-supporting structures including natural polymers, which have a self-adherent coating including a hydroxy-functional polyester thereon so as to be resistant against moisture.

This invention was made with government support Grant Agreement No. 59-3K95-3-126 awarded by the United States Department of Agriculture/Agricultural Research Service. The government has certain rights in this invention.

BACKGROUND OF THE INVENTION

Disposable films and expanded (foamed) articles with reduced permeability to water and water vapor are useful for a variety of packaging and agricultural applications, and starch has been suggested as a component for such articles. Starch itself does not make acceptable films, although blends of starch and polyvinyl alcohol have long been known and can be formed into films with good elongation that are quickly dissolved by water. Such films have found applications, for example, as institutional laundry bags since they dissolve in the washing process. Additions to such films of a plasticizer such as glycerol are also known. See, for example, Westhoff et al., Starch-Stärke, 31, pp. 163–165 (1979) and Lawton & Fanta, Carbohydrate Polymers, 23, pp. 275–280 (1994). While useful for various applications where water solubility is needed, such starch and polyvinyl alcohol films are soft, have little or no water resistance, and thus are not applicable for uses where greater structural integrity and water resistance are required.

U.S. Pat. No. 5,510,401, inventors Dehennau et al., issued Apr. 23, 1996, discusses the coating of a hydrophilic polymer, such as starch or gelatin, with a film-forming hydrophobic compound. A preferred polymer acting as a coupling agent for such films is a polyolefin modified by grafting maleic anhydride, and of ethylene copolymers and terpolymers containing units derived from maleic anhydride.

U.S. Pat. No. 3,949,145, inventors Otey et al., issued Apr. 6, 1976, describes biodegradable starch-based agricultural mulch films that are completely covered with a water resistant resin coating such as PVC. However, the water-resistant resin coating must be bonded to the starch film to prevent delamination. Accordingly, a bonding agent formed from a polyol and toluene diisocyanate is used to prevent delamination. Thus, both the preferred water resistant coating and the necessary bonding agent are not readily biodegradable so that when they deteriorate in the field there can be, over time, a build-up of synthetic polymers in the soil.

U.S. Pat. No. 4,863,655, inventors Lacourse et al., issued Sep. 5, 1989, describes the disposal problems associated with most presently used packaging materials formed from synthetic polymers. For example, although expanded polystyrene is a resilient, compressible and low density (about 0.25 lb/ft$^3$) protective packaging filler material and performs its protective function well (e.g. as the ubiquitous "peanuts"), it is not biodegradable.

U.S. Pat. No. 5,412,005, issued May 2, 1995, inventors Bastioli et al. describes biodegradable polymeric compositions based on starch and thermoplastic polymers. However, the preferred polymers are water soluble, such as polyvinyl alcohol. Although these films are biodegradable and absorbent, they are not suitable (at least unless laminated to water insoluble films) for water resistant applications.

U.S. Pat. No. 5,095,054, issued Mar. 10, 1992, inventors Lay et al. describes shaped articles from conventional thermoplastic water-insoluble polymers and melted starch. While these blends may be usefully formed into articles for various applications, they are said to retain a surprisingly high degree of disintegration in contact with liquid water, and thus have limited usefulness with applications where moisture resistance is desired.

As a consequence, attempts continue to be made to find starch-based or starch including, self-supporting substrates that can be formed into articles, such as, for example, disposable films or foamed articles, and that have sufficient water-resistance for the intended applications yet which are biodegradable. Such articles further need to be competitive in price with commodity plastics such as polyethylene or polystyrene.

SUMMARY OF THE INVENTION

In one aspect of the present invention, an article comprises at least two layers. One of the layers is a self-supporting structure, such as a foam or film that includes a natural polymer. Another of the layers is self-adhered to the structure, and includes a hydroxy-functional polyester.

Representative chemical structures for suitable hydroxy-functional polyesters as a self-adherent layer in practicing this invention are preferably represented by Formula A (where n is 10 to 1000, suitable for providing a desired molecular weight, such as for example a m.w. of about 50,000–100,000). Higher molecular weights are preferred due to higher strength.

FORMULA A

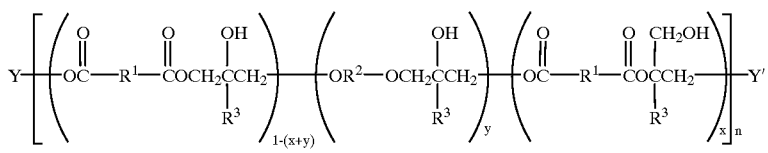

In Formula A each of R$^1$ and R$^2$ is individually a divalent organic moiety which is predominately hydrocarbon, each R$^3$ is individually hydrogen or lower alkyl, y is a fraction from 0 to 0.5 and x is a fraction from about 0.05 to about 0.4. Typically Y is hydrogen or glycidyl and Y' is glycidyl arylene ether, glycidyl alkyene ester, glycidyl alkylene ether or glycidyl arylene ester.

Suitable polyesters have repeating units represented by Formula B (where each of R$^1$, R$^2$, R$^3$, x, and y are as defined above).

FORMULA B

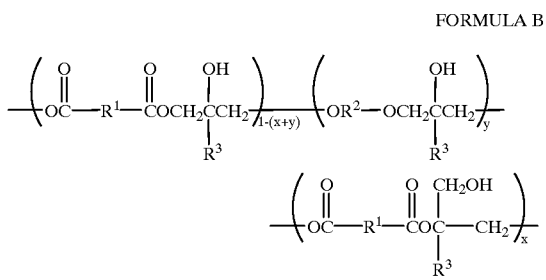

The hydroxy-functional polyesters of Formula A have been found to be surprisingly adherent to surfaces formed from or based on natural polymers, such as starches. This is particularly surprising in view of the fact that other aliphatic polyesters with low water absorption are known and have been used as coatings for natural polymers such as starch, yet adherence in such prior known coatings has been poor. As a consequence, adequate adhesion has only been achieved by special treatments for the starch surface, such as adding an adhesive agent before coating with polyester. (See, for example, PCT application WO 90/01043, published Jul. 13, 1989, inventors Tomka et al.) By contrast, use of the Formula A hydroxy-functional polyesters as the self-adhered layer (or sufficient of the hydroxy-functional polyesters in polymer blends) on natural polymer based films results in articles that do not delaminate even when soaked in water and stretched. The hydroxy-functional polyesters or polyester and other polymer blends can optionally include a plasticizer.

The self-adherent coating formed by hydroxy-functional polyester may define the exterior of the so-coated structure, in which case it provides substantial water resistance for the article. However, the synthetic polymer layer may itself be sandwiched between, and adherently join, the natural polymer based structure with another layer or structure so as to form a laminate of three or more layers.

The self-supporting structure (which may be, for example, a film or an expanded article) defines a surface on which the just described hydroxy-functional polyester is adherently carried. This surface includes a natural polymer, most preferably starch. The preferred starch is derived from a gelatinized starch or a gelatinized modified starch. By "modified" is meant that the starch can be derivatized or modified by typical processes known in the art (e.g. esterification, etherification, oxidation, acid hydrolysis, cross-linking and enzyme conversion). Thus, for example, a modified starch may be a starch ester, a starch ether, or a crosslinked starch. Conventional modifications of starch are described in publications such as *Starch: Chemistry and Technology*, 2d edition, editor Whistler et al., and *Starch Derivatives: Production and Uses*, Rutenberg et al., Academic Press, Inc., 1984.

BRIEF DESCRIPTION OF THE DRAWINGS

FIG. 1 illustrates a perspective view of a foam tray such as may be composed of the layers of the invention;

FIG. 2 is a cross-section of the FIG. 1 tray, showing three layers as a laminate; and FIG. 3 graphically illustrates an embodiment of the invention being subjected to stretch and that does not delaminate up to the point of breakage.

DETAILED DESCRIPTION OF THE PREFERRED EMBODIMENTS

Broadly, the invention is a biodegradable article having at least two layers. One of the layers is a self-supporting structure. That is to say, the structure has sufficient structural integrity so as to be physically manipulated in and used for the desired applications. For example, where the self-supporting structure is a film, the film can be used for various applications such as packaging and in agricultural applications (e.g. mulch films), will thus typically be flexible and have sufficient thickness to act as a barrier, which may be a thickness of as little as 5–20 $\mu$m. Other contemplated self-supporting structures are those in which articles have been expanded to be resilient, compressible, low density articles. For example, molded articles suitable for containing takeout foods are one of the preferred applications, and FIG. 1 illustrates a tray for such an article, although preferred expanded, or foam, structures can be formed in substantially any shape or size desired. Particularly preferred expanded articles are resilient, and preferably have a resiliency (that is the ability to recover an original shape) of at least about 50%, more preferably 60%. Further, preferred expanded articles are compressible with a desired compressibility in the range of about 50–1000 gm/cm$^3$ (0.05 MPa to 1 MPa).

Referring to FIG. 2, the self-supporting structure in foam form is illustrated as interior layer 12. Adherently carried on the surface of structure 12 is a hydroxy-functional polyester shown as layer 14. This polyester layer 14 will normally be on the order of about 1–30 $\mu$m thick, since there is no need to have more than about 40 $\mu$m thickness to achieve the two primarily desired properties: adherency to structure 12 and moisture resistance. In the particularly preferred embodiment shown by FIGS. 1 and 2, a third layer, or structure, 16 is carried on and adhered to article 10 via layer 14. This third layer 16 may be desired for reasons of even further increased resistance to moisture, to heat, or to both moisture and heat.

The structure 12 includes a natural polymer. This structure can be entirely formed of a natural polymer such as gelatinized starch, but preferably will include one or more additional components, as will be discussed hereinafter. Other suitable natural polymers include various forms of cellulose. For example, self-adherent, moisture resistant coatings have been formed on a wide variety of papers, including bond paper that includes a high rag (cotton) content.

Suitable Hydroxy-Functional Polyesters

As will be understood, the just described self-supporting structure will define the surface on which a hydroxy-functional polyester is adhered. This surface can comprise all or only a portion of the total exterior surface of the self-supporting structure, since the desired properties due to the hydroxy-functional polyester layer may not be needed for the entire surface. The hydroxy-functional polyester layer can be applied (and self-adheres to) the desired surface by substantially any application technique, including brushing, dipping, spraying, compression molding, coextruding, and hot roll laminating.

Suitable biodegradable, water insoluble, synthetic polymers for forming the adherent, moisture resistant layer include hydroxy-functional polyesters, which may be prepared from base-catalyzed nucleophilic addition of suitable acids to epoxies. This reaction generates both an ester linkage and a pendent hydroxyl group. Transesterification and cross linking reactions are eliminated through use of quaternary ammonium halide salts as initiators for the reaction of diacids with diglycidyl ethers, providing convenient preparation of high molecular weight, thermoplastic, hydroxy-functional polyesters in ether solvents at temperatures from 80° C.–160° C. The preparation and structures for such hydroxy-functional polyesters suitable in practicing this invention may be as described by U.S. Pat. No. 5,171,820, inventors Mang and White, issued Dec. 15, 1992, which is hereby incorporated in its entirety by reference.

Data provided by the Dow Chemical Company (manufacturer of hydroxy-functional polyesters such as described by U.S. Pat. No. 5,171,820) indicates the biodegradable nature of these polymers through the ability of various soil bacteria (such as Pseudomonas putida) to use the synthetic polymers as a substrate for cell culture growth.

Representative structures for suitable hydroxy-functional polyesters in practicing this invention are preferably represented by Formula A (where n is a whole number from 10 to 1000 and is chosen so as to provide a sufficient molecular weight, such as for example a m.w. of about 50,000–100,000). Higher molecular weights are preferred due to higher strength.

FORMULA A

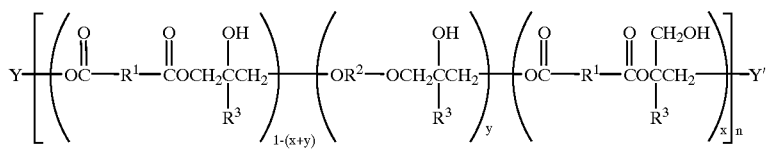

In Formula A each of $R^1$ and $R^2$ is individually a divalent organic moiety which is predominately hydrocarbon, each $R^3$ is individually hydrogen or lower alkyl, y is a fraction from 0 to 0.5 and x is a fraction from about 0.05 to about 0.4. Typically Y is hydrogen or glycidyl and Y' is glycidyl arylene ether, glycidyl alkyene ester, glycidyl alkylene ether or glycidyl arylene ester.

Thus, suitable polyesters have repeating units represented by Formula B (where each of $R^1$, $R^2$, $R^3$, x, and y are as defined above).

FORMULA B

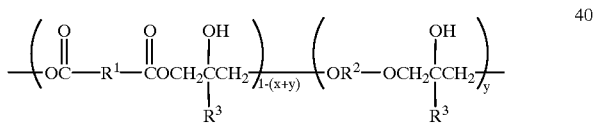

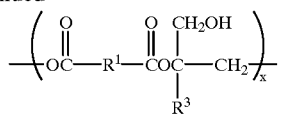

Particularly preferred such polyesters are prepared from diglycidyl esters of an aliphatic diacid such as adipic due to the ready availability and reasonable price for adipic acid as a source of reactant. Other particularly preferred polyesters may be prepared from dihydric phenols, such as hydroquinone.

Four particularly preferred hydroxy-functional polyesters, used extensively to illustrate (but not to limit) the present invention, are sometimes hereinafter designated "BIS CHD," "BIS Adipic," "HQ DDCA" and "BIS DDCA." Repeating unit structures for these four illustrative hydroxy-functional polyesters are illustrated by Formulas C–F and several of their properties of interest for the invention are summarized in Table A.

FORMULA C

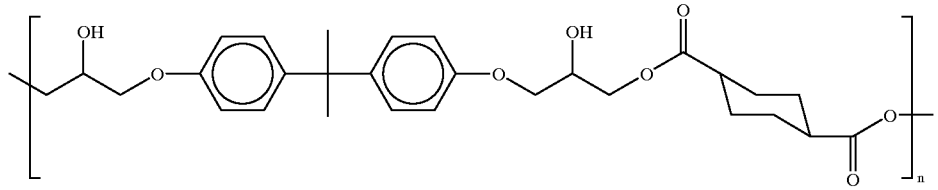

FORMULA D

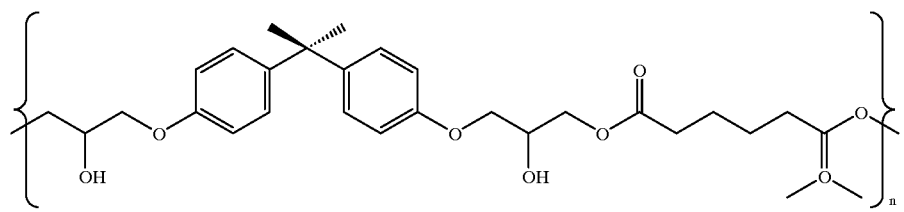

-continued

FORMULA E

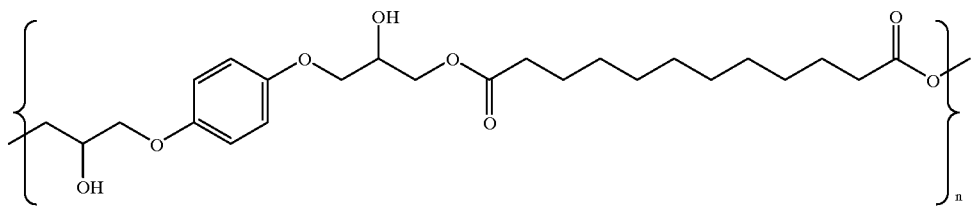

FORMULA F

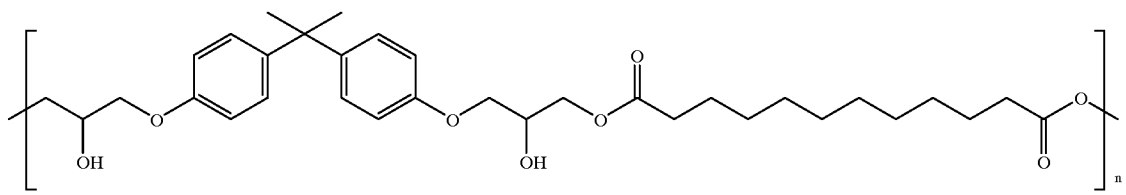

In the Formulas C–F, "n" preferably is as earlier described.

As shown in Table A, several of the preferred hydroxy-functional polyesters have a relatively low Tg. When applying the hydroxy-functional polyester layer, some melting of the polymer will be necessary to adhere onto the surface of the self-supporting structure. As will be understood, the choice of particular pressures and temperatures to provide at least some melting so as to adhere the layer to the surface will be empirically determined according to processing needs and the components selected, and thus will vary.

TABLE A

| Hydroxy-Functional Polyester Components | Tg(° C.) |
|---|---|
| BIS CHD | 66 |
| BIS Adipic | 45 |
| HQ DDCA | 10 |
| BIS DDCA | 20 |

The hydroxy-functional polyester layer may include other components, such as, for example, a plasticizer, other synthetic polymers, or polyols such as PVOH. Inclusion of a plasticizer may be desired for purposes of improving flexibility and/or processibility. When present, the plasticizer may be in amounts with respect to the hydroxy-functional polyester of about 1 to 5 wt. %. Suitable plasticizers include, for example, citric acid esters, polyethylene glycols, glycol esters, phthalic esters, and the like.

Natural Polymers

Among the natural polymers suitable and preferred for forming a structure with sufficient structural integrity to be considered self-supporting (be it in the form of a film or another form such as an expanded article) is starch. Starches are preferred for use as the natural polymers, particularly due to ready availability and low cost. Starch is a low-cost and abundant natural polymer composed of amylose and amylopectin. Amylose is essentially a linear polymer having a molecular weight in the range of 100,000–500,000, whereas amylopectin is a highly branched polymer having a molecular weight of up to several hundred million. Unmodified, natural starches are obtained in granular form and may be derived from cereals or grains (such as corn, wheat, rice and sorghum), roots (such as cassava), legumes (such as peas), and tubers such as potato and canna. While less preferred, flours whose contents are predominately starch, and which may also contain protein, oil and fiber, are operative in the invention.

When starch is said to be "gelatinized" it has melted and lost its crystalline state. The starch molecules have taken on a random, disordered configuration and the starch chains have become entangled.

Derivatized (modified) starches are also suitable for use in preparing self-supporting structures. By "derivatized starches" is meant to include starches which have been chemically treated so as to form starch esters, starch ethers, and crosslinked starches. By "modified" is meant that the starch can be derivatized or modified by typical processes known in the art (e.g. esterification, etherification, oxidation, acid hydrolysis, cross-linking and enzyme conversion). Typically, modified starches include esters, such as the acetate ester of dicarboxylic acids/anhydrides. Particularly useful are the alkenyl-succinic acids, and hydrides, ethers (such as the hydroxyethyl and hydroxypropyl starches), starches oxidized with hypochlorite, starches reacted with cross-linking agents such as phosphorus oxychloride, epichlorhydrin, hydrophobic cationic epoxides, and phosphate derivatives prepared by reaction with sodium or potassium orthophosphate or tripolyphosphate and combinations thereof. These and other conventional modifications of starch are described in publications such as *Starch: Chemistry and Technology*, 2d edition, editor Whistler et al., and *Starch Derivatives: Production and Uses*, Rutenberg et al., Academic Press, Inc. 1984.

For example, starch esters may be prepared using a wide variety of anhydrides, organic acids, acid chlorides, or other esterification reagents. Examples of anhydrides are acetic, propionic, butyric, and so forth. Further, the degree of esterification can vary as desired, such as from one to three per glucosidic unit of the starch, or as appropriate given the number of hydroxyl groups in the monomeric unit of the natural polymer, if selected to be other than starch. Similar or different esterified natural polymers, with varying degrees of esterification, can be blended together for practicing the invention. Although esterified starches are stable to attack by amylases, in the environment the esterified starches are attached by microorganisms secreting esterases which hydrolyze the ester linkage.

Starch esters tend to be hydrophobic in contrast to starch raw materials (that is, derived by usual techniques from natural sources such as corn). Thus, depending upon the particular application, one may prefer to choose an hydrophobic starch ester rather than a hydrophilic starch in formulating compositions of the invention.

Where the natural polymer structure is expanded, then typically such expanded article has been produced as an extrudate. Extrudates typically are claimed to have substantially closed cell structures, although some recent work suggests open cell structures can occur, but in any event the structures have good resilience and compressibility. Expansion, or foaming, is achieved from precursor compositions that include an expansion agent and that are in molten form. Precursor foam compositions will typically be processed in a suitable apparatus, such as a single screw extruder or a twin screw extruder as are well known in the food science field. Food extruders can be regarded as high temperature, short time reactors, in which granule starch having a moisture content of roughly 10–25% is first compressed into a dense, compact solid and then is converted into a molten, amorphous mass by the high pressure, heat, and mechanical sheer forces encountered during processing. Starch extrudates tend to expand upon exiting the extruder die. Preparation of such foamed substrates suitable in practicing this invention is described, for example, by Tiefenbacher, Karl F., "Starch-Based Foamed Materials—Use and Degradation Properties," *J.M.S.—Pure Appl. Chem.*, A30 (9 & 10), pp. 727–731 (1993).

While water is a typical expansion agent, U.S. Pat. No. 5,252,271, inventor Jeffs, issued Oct. 12, 1993, describes compositions for forming expanded products that include mild acid and a carbonate source so that the releasing carbon dioxide serves as the expansion agent. Nitrogen or other appropriate agents for the expansion may also be used.

In addition to inclusion of an expansion agent, precursor foam compositions may include various other components known to the art. For example, among known components for compositions to be expanded are nucleating agents, which can improve the uniformity of cells formed during expansion and which tend to make the cells smaller. Suitable nucleating agents are well known to the art and include, for example, talc, silicon dioxide, amorous silicates, spray-dried silicon, calcium carbonate, boron nitride, and the like.

Another suitable optional material for inclusion into foams is a plasticizer (in addition to the gelatinizing agent as already discussed). A plasticizer can be added to precursor foam compositions to achieve greater material processability and product flexibility. Examples of biodegradable plasticizers include various esters, such as phthalate esters, and various other biodegradable esters known in the chemical arts.

Where the natural polymer base self-supporting structure is a film, then again the precursor composition will typically be processed in a suitable apparatus, such as a single screw extruder or a twin screw extruder.

When one uses a single screw extruder, then normally the precursor film composition will have the starch already gelatinized. A precursor film composition in which the starch component is to be gelatinized will typically have water present in a range of about 25 wt. % to 30 wt. % with respect to total composition. Water, of course, is the usual liquid in which starch is gelatinized and its role in the gelatinization can be viewed as one of plasticizer. While water is preferred, other gelatinizing agents, or plasticizers, can be used, for example, such as urea or glycerol.

Precursor film compositions can be melt processed into films using either cast or blown film extrusion methods, both of which are described in "Plastics Extrusion Technology—2nd. Ed." by Allan A. Griff (Van Nostrand Reinhold, 1976).

Cast film is extruded through a linear slot die. Typically, the flat web is cooled on a large moving polished metal roll. It quickly cools, and peels of this first roll passes over one or more auxiliary cooling rolls, then through a set of rubber-coated pull or "haul-off" rolls, and finally to a winder.

In blown film extrusion, the melt is extruded upward through a thin annular die opening. This process is also referred to as tubular film extrusion. Air is introduced through the center of the die to inflate the tube and causes it to expand. A moving bubble is thus formed which is held at constant size by control of internal air pressure. The tube of film is cooled by air blown through one or more chill rings surrounding the tube. The tube is next collapsed by drawing it into a flattening frame through a pair of pull rolls and into a winder.

Structures that include a natural polymer such as starch may preferably also include a polyol such as polyvinyl alcohol, because starch by itself has poor strength and flexibility properties. Blends of starch and polyvinyl alcohol have long been known and are commercially available as films with good elongation properties. Typical ranges of starch and polyvinyl alcohol blends are where starch is present in a range of about 40 wt. % to about 90 wt. %.

EXPERIMENTAL

Aspects of the invention will now be illustrated, without intending any limitation, by the following examples.

EXAMPLE 1

Solutions of hydroxy-functional polyesters suitable for use as the self-adherent layers and to form moisture resistant coatings in practicing the invention were prepared, three of which are indicated below by the acronyms "HQ-DDCA," "BIS Adipic," and "BIS CHD." These solutions were 10 wt. % of the noted hydroxy-functional polyester in tetrahydrofuran. Two comparative polyesters were similarly dissolved in appropriate solvents. These were poly(lactic acid) and poly-hydroxybutyrate-co-valerate, designated by the acronyms "PLA" and "PHBV," respectively. Films formed either entirely of starch or by about equal amounts of starch and PVOH, and having a thickness of about 50 $\mu$m, were then coated with solutions of the different polyesters by brushing, spraying, and/or dipping. After having applied the synthetic polymers to the substrate surfaces, the solvents were removed by applying a stream of air. The ease of removing the coatings from the films was determined first in a dry condition by pulling by hand and alternatively after soaking the films in water for 15 minutes, then 30 minutes, and again attempting to pull off the coatings. Table 1 summarizes the results.

TABLE 1

| | Ease of Coating Removal | |
|---|---|---|
| | Dry | After Water Soaking |
| Inventive Coated Film Embodiments | | |
| 1 (HQ-DDCA/Starch & PVOH Film) | Difficult | Difficult |
| 2 (BIS Adipic/Starch & PVOH Film) | Difficult | Difficult |
| 3 (BIS CHD/Starch & PVOH Film) | Difficult | Difficult |
| 4 (BIS Adipic/Starch Film) | Somewhat Difficult | Easy |

TABLE 1-continued

| | Ease of Coating Removal | |
|---|---|---|
| | Dry | After Water Soaking |
| Comparative Coated Films | | |
| 5 (PLA/Starch & PVOH Film) | Easy | Easy |
| 6 (PHBV/Starch & PVOH Film) | Easy | Easy |

As seen by the summarized results of Table 1, it was at least somewhat difficult to remove these coatings from the inventively coated film embodiments in the dry condition, and remained difficult in three instances. In the fourth inventive example, the film that was entirely starch permitted easy removal after water soaking. Thus, the adhesion to the starch and PVOH film blends were greater than in the case of all starch films, which is one reason for preferring structures (be they film, foam or another form) that are starch blends. By contrast, the comparative coated films (both comprising a blend of starch and polyvinyl alcohol) had the other polyesters easily removed even in the dry state. Thus, the comparative PLA and PHBV polyesters were not well adhered to the self-supporting starch blend films, whereas the hydroxy-functional polyesters on films of the invention were well adhered.

EXAMPLE 2

Turning to FIG. 3, data from an inventive embodiment with BIS Adipic coated onto a starch/PVOH blend in a "dog-bone" form is illustrated. Measurements were taken on an Instron testing machine as the dog-bone specimen was subjected to being pulled. The inventive embodiment did not delaminate. The specimen failed (pulled apart) before delamination had occurred. By contrast, a comparative dog-bone specimen was prepared having poly(lactic acid) coated onto the same starch/PVOH blend substrate. When subjected to the same pulling test, the comparative specimen delaminated before a displacement of 600 was achieved (and thus before the starch/PVOH substrate itself have pulled apart).

EXAMPLE 3

More polyester solutions were prepared, all of which were hydroxy-functional polyesters suitable for use in the invention. Two of these were coated on starch based foam trays (such as are used for serving fast foods). Foam trays made of starch would not normally be suitable for applications where there is exposure to moisture; however, the hydroxy-functional polyester coatings not only adhered extremely well, but also conveyed substantial water resistance to the so-coated trays. Three more different types of substrates were also coated, which illustrate that different types of natural polymers are suitable substrates in practicing the invention.

As seen by the summarized results of Table 2, all these inventive embodiments 7–11 had well adhered coatings.

TABLE 2

| | Ease of Coating Removal | |
|---|---|---|
| | Dry | After Water Soaking |
| Inventive Coated Foam Trays | | |
| 7 (HQ-DDCA/Starch Tray) | Difficult | Difficult |
| 8 (BIS Adipic/Starch Tray) | Difficult | Difficult |
| Inventive Coated Substrates | | |
| 9 (BHPF-CHD/Bond Paper) | Could not remove | Difficult |
| 10 (BHPF-CHD/Manila Folder) | Could not remove | Difficult |
| 11 (BHPF-CHD/Box Board) | Could not remove | Difficult |

EXAMPLE 4

Films were prepared by mixing 41% starch, 41% PVOH, 15% glycerol, and 3% poly(ethylene-co-acrylic acid), which mixtures were steam jet cooked. The mass exiting the jet cooker was about 90% water. This material was cast with a doctor blade onto casting plates and the water allowed to evaporate to provide self-supporting films. Tensile specimens were stamped from the film. Some specimens were coated by dipping into various hydroxy-functional polyesters dissolved in tetrahydrofuran (10% wt/wt). This organic solvent was then allowed to evaporate to leave the specimens coated with the polyesters. The uncoated films were used as a control. Inventive embodiments and control were measured for tensile strength after equilibration at 23° C. and 50% relative humidity. They were then soaked in water first for 15 minutes and then for 30 minutes. The results are summarized by Table 3.

TABLE 3

| | Tensile Strength, MPa | | |
|---|---|---|---|
| | No Water Immersion | 15 Min. Water Immersion | 30 Min. Water Immersion |
| Inventive Coated Film Embodiments | | | |
| 12 (BIS Adipic on Starch and PVOH Film) | 23.4 | 15.8 | 13.4 |
| 13 (HQ-DDCA on Starch and PVOH Film) | 22.7 | 18.8 | 17.5 |
| 14 (BIS CHD on Starch and PVOH Film) | 13.9 | 16.8 | 9.3 |
| Control | | | |
| 15 (No Coating on Starch and PVOH Film) | 27.9 | 0.4 | Had Fallen Apart |

As seen by the results of Table 3 summarized above, the uncoated control film had an initial higher tensile strength than the inventive embodiment, but after a 15 minute water immersion the uncoated film was swelling (it had almost doubled) and was beginning to disintegrate. After 30 minutes of water immersion, the control film had disintegrated. By contrast, the inventive embodiments maintained good tensile strength after 15 minutes and even after a 30 minute water immersion continued to have reasonable tensile strength. None of the inventive articles 12–14 delaminated even after a 30 minute water immersion.

EXAMPLE 5

The same films as described in Example 4 were then stretched. Results of elongation measurements are summarized by Table 4.

TABLE 4

| | Elongation % | | |
|---|---|---|---|
| | No Water Immersion | 15 Min. Water Immersion | 30 Min. Water Immersion |
| Inventive Coated Film Embodiments | | | |
| 12 (BIS Adipic on Starch and PVOH Film) | 270 | 319 | 312 |
| 13 (HQ-DDCA on Starch and PVOH Film) | 130 | 223 | 232 |
| 14 (BIS CHD on Starch and PVOH Film) | 218 | 311 | 351 |
| Control | | | |
| 15 (No Coating on Starch and PVOH Film) | 205 | 126 | 154 |

As seen by the results summarized by Table 4, the inventively coated film embodiments 12–14 generally increased in elongation properties after 15 minute immersion. By contrast, the uncoated control lost half of the elongation percent property after 15 minute water immersion. Further, the inventive coated film embodiments 12–14 did not delaminate even after soaking and being stretched. This further illustrates the remarkable self-adherency of coated films in accordance with this invention.

EXAMPLE 6

Compression molded films of various of the hydroxy-functional polymers were prepared by compressing powders of the materials between Teflon-coated metal sheets in a Carver Press. Depending upon the particular hydroxy-functional polyester, temperatures of 100° C. to 180° C. and pressures of 1000 lbs. to 9000 lbs. were used to compression mold the synthetic resins into films. These films had thicknesses of 4 mil to 10 mil. Comparison compression films, analogous to those of the inventive embodiments but composed of PHBV and PLA, were similarly prepared. These compression molded films were then coated onto various substrates. For example, in Table 5#20 was an inventive embodiment in which BIS Adipic was on (adhered to) a starch and PVOH blend film for direct comparison with comparative articles 22 and 23 where two separate synthetic polymers (not of the invention) were similarly on the same type of starch and PVOH blended film. Coating was accomplished by placing the films on one or both sides of the selected substrates, then placing the assembly between metal plates in a Carver press and compressing at elevated temperature and pressure. The so-compressed articles were then examined for adherence of the particular polyester to the substrate. Table 5 summarizes the data of these compression molded adherence studies.

TABLE 5

| | Ease of Removal from Substrate |
|---|---|
| Inventive Compression Molded Embodiments | |
| 16 BIS Adipic Adhered to PVOH Film | Impossible, Films Compressed into One |
| 17 BIS Adipic Adhered to PHBV Film | Impossible, Films Compressed into One |
| 18 BIS Adipic Adhered to Cellulose Acetate Film | Impossible, Films Compressed into One |
| 19 BIS Adipic Adhered to PLA Film | Impossible, Films Compressed into One |
| 20 BIS Adipic Adhered to Starch and PVOH Film | Difficult |
| 21 BIS Adipic on Starch Tensile Bar | Difficult |
| Comparative Compression Molded Articles | |
| 22 PVBV on Starch and PVOH Film | Easy |
| 23 PLA on Starch and PVOH Film | Easy |

As shown by the results summarized in Table 5, inventive compression molded embodiments were so firmly adhered, or laminated, one layer to the other that the hydroxy-functional polyester layers were difficult to impossible to remove. By contrast, for the comparison compression molded articles, removal was easy. In particular, a comparison between the inventive embodiment 20 and the comparative articles 22 and 23 shows the self-adherent nature of hydroxy-functional polymers of the invention when compared with the two illustrated synthetic polyesters for comparison.

EXAMPLE 7

Blown films were prepared from hydroxy-functional polyesters, some of which contained Estaflex (containing citric acid) as plasticizer. These were processed as blown films on a Brabender PL 2000 torque rheometer fitted with a one inch blown film die. Blown films had a lay flat width of 3–6 inches. Pieces of the films were then laminated onto various substrates and the adherence to the substrate determined. Films composed of either all BIS Adipic or 5 wt. % BIS Adipic and 5 wt. % plasticizer were laminated onto substrates (such as starch and PVOH films or boxboard). It was difficult to impossible to separate the two layers from each other.

EXAMPLE 8

Extrusion blown films of BIS Adipic and HQ-DDCA were prepared as in Example 7. Sections of film measuring about 6 inches by 8 inches were positioned onto starch-based foam trays such that the entire upper surface was covered by the film. The trays were placed back in the tray mold, heated to 100° C. (which was higher than necessary, but done for convenience), the film was covered with Teflon coated foil to prevent sticking to mold, and the tray mold was closed for 1 minute. The tray was removed after 1 minute, cooled, and the Teflon coated foil removed. Both the film of BIS Adipic and the film of HQ-DDCA adhered well to the trays and could not be removed. The starch-based foam beneath the laminated films remained dry even when 100 ml of water was added to each tray and left sitting for hours.

EXAMPLE 9

Extrusion blown BIS Adipic and HQ-DDCA films were evaluated for their ability to form an adhesive layer between a third layer (a film of PHBV) and a starch foam tray surface.

Sections of films about 6 inches by 8 inches were prepared. On one tray a section of BIS Adipic film was placed on the upper surface of the tray and a film of PHBV was placed over this film. On a second tray a section of HQ-DDCA film was placed on the upper surface and a section of PHBV placed on top of this film. Each tray was then placed in the heated tray mold set at 100° C. and the mold was closed for 30 seconds. Upon removal of the trays, the third, or outer layer, of PHBV film was adhered very tightly to the hydroxy-functional polyester films, which were adhered very tightly to the foam trays. The films could not be separated from the tray without removing portions of starch from the tray. Thus, the hydroxy-functional polyester layer served to adhere both the starch foam structure and the outermost PHBV layer in a laminated form, with the hydroxy-functional polyester sandwiched between. In the absence of the BIS Adipic or HQ-DDCA films, films of PHBV could not be made to adhere to the starch foam trays.

Such a triple layer, laminated structure maybe desirable for certain applications since the outermost, or exterior, layer of a polymer such as PHBV has a higher melting temperature and is even more moisture resistant than the hydroxy-functional polyester used. This example thus illustrates multiple layer structures of the invention having extremely good heat resistance and moisture resistance.

EXAMPLE 10

Use of a hydroxy-functional polyester as an adhesive layer between polymers, preferably other biodegradable polyesters, was exemplified in a manner similar to Example 9 but where instead of PHBV were used either PLA, polycaprolactone, another synthetic polyester termed "BIONOLLE" (Showa High Polymer Co., Japan), and yet another synthetic polyester-co-polyamide, available from Bayer as "Bak 1095." Good adherence was provided in all cases by the hydroxy-functional polyester to both layers between which it was sandwiched.

EXAMPLE 11

Blends of hydroxy-functional polyesters with other materials were prepared. These blends were in a 50/50 proportion and were blended as powders. All three blends used BIS Adipic. The first blend was with PVOH. The second blend was with PHBV (containing 18% valerate). The third blend was with another hydroxy-functional polyester (BIS CHD). Compression molding of these blends at 5000 psi and 180° C. for 5 minutes provided films, sections of which were laminated on a starch foam tray, as described by Example 8. Upon cooling, each of the inventive articles had the self-adherent layer (including 50 wt. % or more hydroxy-functional polyester) so tightly adhered to the foam surface that removal was not possible without removing some of the foam surface.

EXAMPLE 12

Two articles of the invention were prepared and compared to a third article. Thus, to prepare the inventive articles, CHD and BIS Adipic films were laminated onto preformed starch-PVOH films with a Hot Roll Laminator (ChemInstrument, Fairfield, Ohio). Films were laminated at 325° F. using the slow speed for BIS Adipic and at 400° F. for BIS CHD. To keep the films from sticking to the hot roll, the films were laminated between two sheets of Teflon coated aluminum foil. Films were allowed to equilibrate at 50% relative humidity and 73° F. for three days. The laminated films were then pulled off the starch-PVOH films using a modified T-peel test, ASTM method D 1876–93. By the same techniques, the comparative article used PCL as film laminated onto preformed starch-PVOH film. Results showed that the inventive articles with BIS Adipic had a 10 fold greater adhesion to the starch-PVOH film with respect to the comparative PCL, and that the inventive BIS CHD article had a 2 fold increase in adhesion to the starch-PVOH with respect to comparative PCL.

EXAMPLE 13

Preformed starch foam trays were coated with different blends including or consisting of hydroxy-functional polyesters. One blend had equal parts of two hydroxy-functional polyesters. In another, the layers included 50 wt. % of BIS Adipic and 50 wt. % of the synthetic polymer PHBV. In a third blend, 50 wt. % of BIS Adipic and 50 wt. % PVOH was used. Each blend was prepared by processing in a Brabender 2000 plasticorder (extruder) fitted with a dispersive screw and a one inch by 0.02 inch slit die. Temperatures in the four zones of the extruder barrel were 150° C., 170° C., 170° C., and 160° C. for the BIS Adipic/BIS CHD and the BIS Adipic/PHBV blend and were 180° C., 200° C., 200° C., and 200° C. for the BIS Adipic/PVOH blend. Extruded ribbons of the three blends were then conditioned at 50 RH and 23° C. for two days.

Strips from these extruded ribbons of about 4 inches in length were then placed on the upper surfaces of the preformed starch foam trays and covered with Teflon coated foil. The trays were then placed in a tray mold preheated to 180° C. (for each of the first two blends) and to 200° C. for the BIS Adipic/PVOH blend. The molds were closed for two minutes and then the trays were removed. After the trays had cooled, the Teflon coated foils were removed and adherence of the strips to the tray surfaces was evaluated by attempting to remove each of the various film blend strips from the trays. It was impossible to remove the films without removing portions of starch from the trays.

EXAMPLE 14

Thermoformed trays suitable as substrates on which a self-adherent hydroxy-functional polyester layer is applied in accordance with the invention were prepared as follows. Formulations of cornstarch (85–95%), Bis Adipic polyester (5–15%), and talc (0.5–1%) were prepared and moisture adjusted to about 17%. These compositions were processed in a Wenger TX-52 Twin Screw Extruder fitted with a slit die of 0.3 mm×6 mm. The extrudates of the various compositions were expanded ribbons of about 25–30 mm in width and 10–12 mm in thickness. Sections of the ribbons about 25 cm in length were placed across a mold cavity configured to produce a tray of width 130 mm, length 215 mm, depth 20 mm and a thickness of about 3 mm. The ribbons extended beyond the width and length of the mold cavity. The mold was heated to 100° C. and the mold was closed for about 10 seconds. Upon opening the mold, the foam ribbons had become compressed and rigid and had assumed the shape of the mold cavity. The rigidity of the thermoformed ribbons increased with increasing polyester content. Films having either BIS Adipic or CHD were then placed onto these thermoformed ribbons and the laminates returned to the molds, heated to 100° C. and the molds closed for about 10 seconds. The resulting laminates in accordance with the invention were actually melted into the surface of the ribbons and could not be separated from the foam ribbon surfaces. This example illustrates the preparation of very moisture resistant, thermoformed articles.

It is to be understood that while the invention has been described above in conjunction with preferred specific embodiments, the description and examples are intended to illustrate and not limit the scope of the invention, which is defined by the scope of the appended claims.

We claim:

1. A moisture resistant, biodegradable, flexible film, comprising:
a self-supporting film including a natural polymer and defining a pair of opposed surfaces, a coating being adhered to at least one of the opposed surfaces and including an hydroxy-functional polyester having repeating units represented by Formula B:

FORMULA B

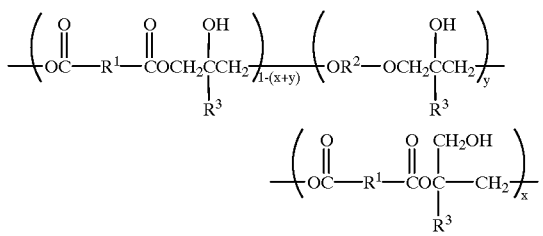

wherein each of $R^1$ and $R^2$ is individually a divalent organic moiety which is predominately hydrocarbon, each $R^3$ is individually hydrogen or lower alkyl, y is a fraction from 0 to 0.5 and x is a fraction from about 0.05 to about 0.4.

2. The film as in claim 1 wherein the natural polymer includes gelatinized starch.

3. The film as in claim 1 wherein the self-supporting film includes gelatinized starch and a hydroxy-functional polyol.

4. The film as in claim 1 wherein the coating is capable of self-adhering to the opposed surfaces when a sufficient amount of the hydroxy-functional polyester is present therein.

5. The film as in claim 1 wherein each of $R^1$ and $R^2$ is:

(a) arylene, alkylenearylene, dialkylenearylene, diaryleneketone, diarylenesulfone, diarylenesulfoxide, alkylenecarbonylarylene, alkylenesulfonylarylene, alkylidenediarylene, diarylene oxide, alkyleneoxyarylene, alkylenethioarylene, diarylene sulfide, or diarylenecyanomethane; or, (b) alkylene, dialkyleneketone, dialkylenesulfone, dialkylenesulfoxide, dialkyleneoxide, or dialkylenesulfide.

6. The film as in claim 1 wherein each of $R^1$ and $R^2$ is individually a divalent aromatic moiety selected from the group consisting of m-phenylene, p-phenylene, isopropylidene, diphenylene, biphenylene, biphenylene oxide, methylenediphenylene, biphenylene sulfide, naphthylene, biphenylenecyanomethane, 3,3'-dialkyldiphenylene-isopropylidene, 3,3'-,4,4'-tetralkyldiphenylene-isopropylidene, and similar alkyl-substituted derivatives of such aromatic moieties.

7. The film as in claim 1 wherein each of $R^1$ and $R^2$ is individually a divalent aliphatic moiety selected from the group consisting of ethylene, propylene, and butylene.

8. The film as in claim 1 wherein each $R^3$ is individually hydrogen or methyl.

9. The film as in claim 1 wherein each of $R^1$ and $R^2$ is a divalent aromatic moiety, an aliphatic hydrocarbon divalent moiety, or an aliphatic heteroatomic moiety wherein the heteroatomic moiety is oxygen, sulfur, imino, sulfonyl, carboxyl, carbonyl, or sulfoxyl.

10. The film as in claim 1 wherein the natural polymer includes a modified starch.

11. The film as in claim 1 wherein the natural polymer is a blend of starch and polyvinylalcohol.

* * * * *